Dec. 31, 1968      R. C. FISCHER      3,419,085
VIBRATOR FOR PLOW
Filed Aug. 24, 1966      Sheet 1 of 2
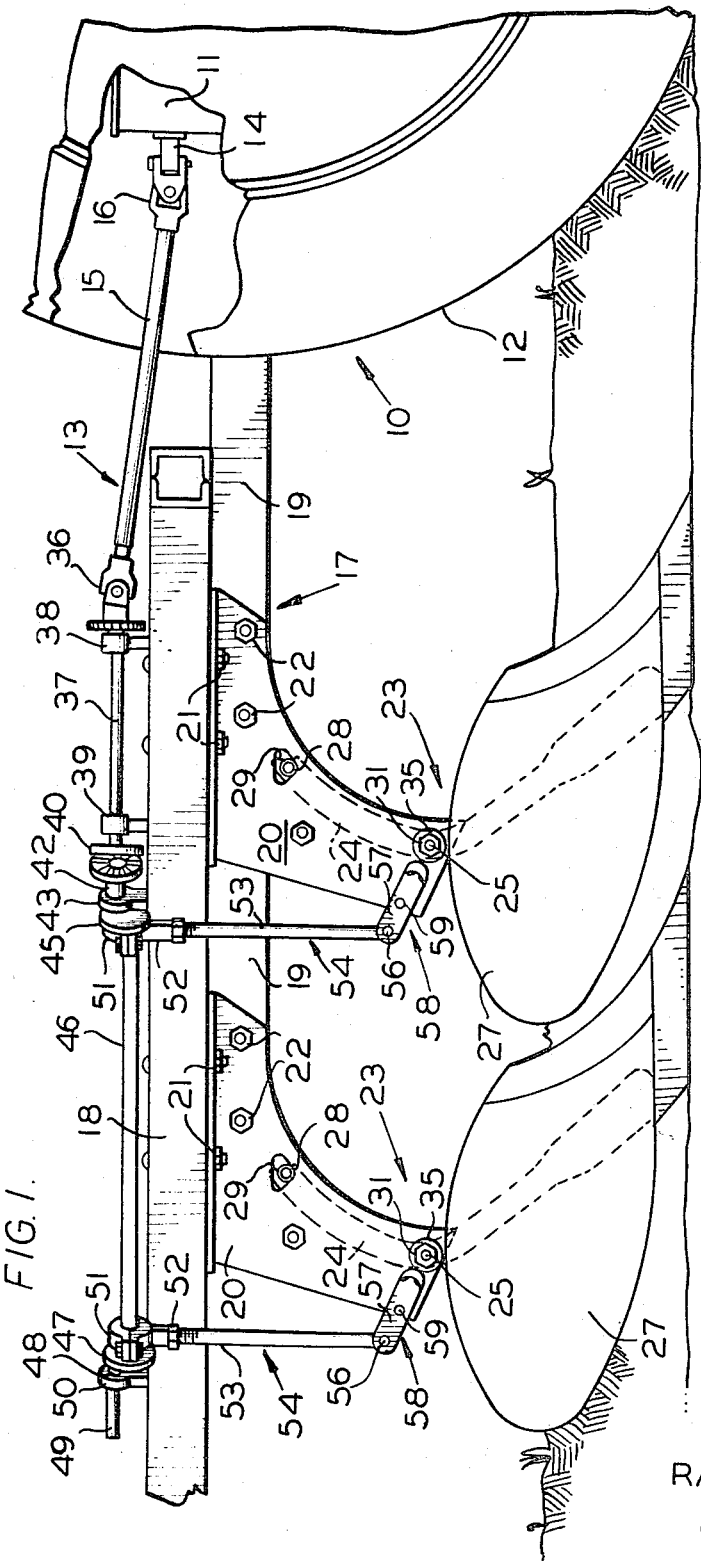
INVENTOR
RAYMOND C. FISCHER
ATT'Y

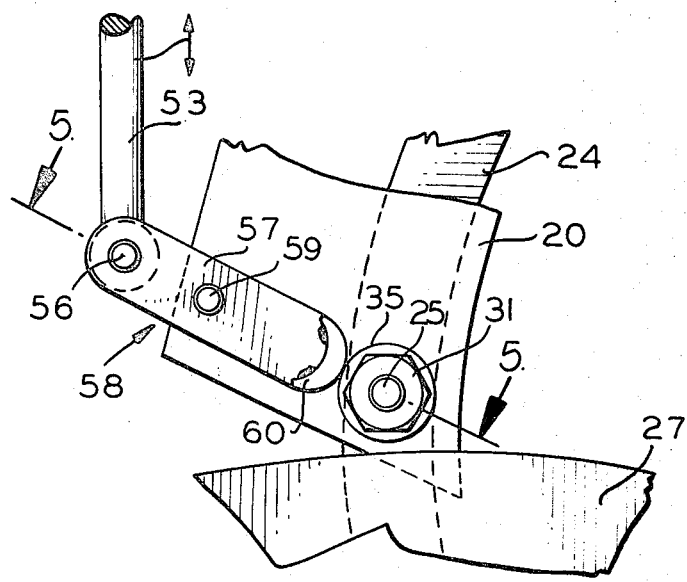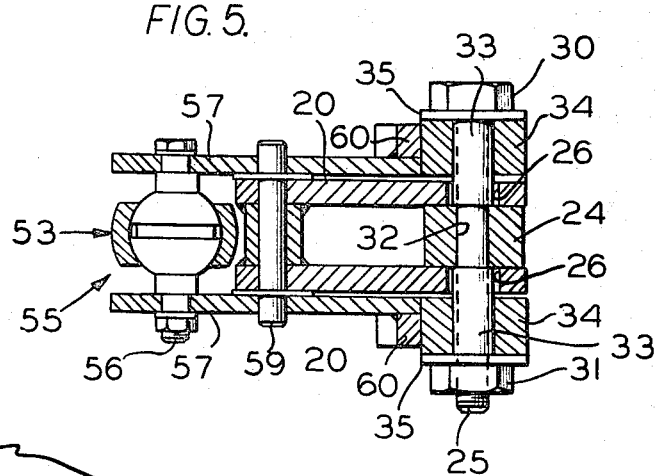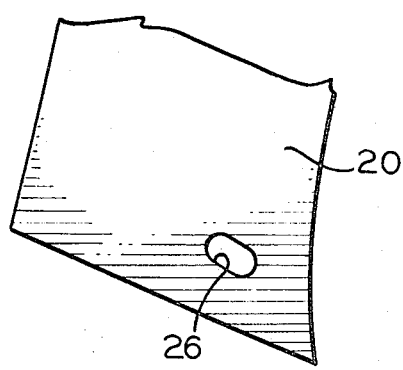

# United States Patent Office 3,419,085
Patented Dec. 31, 1968

3,419,085
VIBRATOR FOR PLOW
Raymond C. Fischer, Hinsdale, Ill., assignor to International Harvester Company, Chicago, Ill., a corporation of Delaware
Filed Aug. 24, 1966, Ser. No. 574,799
5 Claims. (Cl. 172—40)

This invention relates to earth working implements and particularly to means for reducing the power requirement for pulling such an implement through the soil.

One of the disadvantages of conventional equipment, particularly in plowing and the like, is the failure of the plow bottom to scour properly; that is, soil tends to adhere to the bottom and increase the draft needed to propel the plow through the soil. Therefore, an object of this invention is the provision of novel means for inhibiting the adherence of soil to an earth working implement.

Another object of the invention is the provision of novel means for vibrating an earth working tool such as a plow to reduce dirt adhesion to a minimum and thus reduce the power needed to propel the plow through the soil.

Other objects and advantages of the invention will become clear from the following detailed description when read in conjunction with the accompanying drawings wherein:

FIGURE 1 is a view in side elevation, with parts removed, of a tractor connected moldboard plow having a plow bottom vibrating apparatus mounted thereon incorporating the features of this invention;

FIGURE 2 is an enlarged detail of a portion of the power take-off and power transmitting mechanism of this invention for operating the vibrator;

FIGURE 3 is an enlarged detail of a portion of the structure shown in FIGURE 1;

FIGURE 4 is a diagrammatic enlarged detail of a portion of the structure shown in FIGURE 1;

FIGURE 5 is a section taken on the line 5—5 of FIGURE 4; and

FIGURE 6 is an enlarged detail of a portion of the plow supporting bracket.

In the drawings the numeral 10 designates a tractor of a well-known type having power operated means 11, rear drive wheels 12 and power take-off means 13 including a stub shaft 14 driven by the power operated means 11 and a telescoping shaft 15 connected by a universal joint 16 to shaft 14.

The implement on which the vibrating device of this invention is mounted is a multi-bottom moldboard plow having a supporting frame 17 including a diagonally extending rectangular beam 18, longitudinally extending tool bars 19 and laterally spaced plates of a depending bracket 20 secured to beam 18 and tool bars 19 by bolts 21 and 22, respectively.

FIGURE 1 shows the two forwardmost plow units 23 of the plow of this invention, and each such unit includes a curved plow standard 24 confined between the spaced plates 20 and carrying a pivot pin or bolt 25 received in a slot 26 formed in the forward lower portion of each plate 20, to accommodate relative reciprocatory or forward and rearward movement of the standard 24 relative to the plow frame. A moldboard plow bottom 27 is mounted on the forwardly extending lower end of standard 24, and the upper end of the standard beyond pivot pin 25 is notched to receive a pin 28 also carried by plates 20, the notch 29 at the upper end of standard 24 forming a pivotal connection with pin 28 about which standard 24 is capable of longitudinal swinging movement within the confines of slot 26.

It may be understood that the pivotal connection of standard 24 to plates 20 by pin 28 and notch 29 forms part of a plow overload release mechanism forming no part of this invention, the details of construction of which may be had by reference to U.S. Patent No. 3,022,835, it being understood that the invention is applicable to a plow having either a fixed pivot at 28 or a plow capable of breaking away and pivoting rearwardly and upwardly about the axis of pivot bolt 25.

In FIGURE 5 it will be noted that the pivot pin 25 is a bolt having a head 30 and threaded at its other end to receive a nut 31. The bolt 25 is received in slots 26 in plates 20 and in an opening 32 in standard 24. Rollers 34 are rotatably mounted on sleeves 33 carried by pivot bolt 25 adjacent head 30 and nut 31, and are separated therefrom by washers 35, the sleeves 33 abutting standard 24.

Pressure of the soil during operation of the plow and acting upon plow bottoms 27 forces the plow bottom and the standard 24 rearwardly to urge the reduced portion 33 of pivot pin 25 toward the rear of slots 26. Vibration of the plow bottoms during operation to prevent accumulation of dirt, reduce the draft requirements and improve the scouring properties of the plow bottoms is accomplished by a relatively high speed reciprocation of the plow units. For this purpose telescoping power take-off shaft member 13 is connected by a universal joint 36 to a power transmission mechanism including a shaft 37 rotatably mounted in bearings 38 and 39 secured to and projecting upwardly from the plow frame parallel to the direction of travel.

The rear end of shaft 37 has affixed thereto a bevel gear 40 disposed at an angle to and meshing with a bevel gear 41 mounted on a shaft 42 extending diagonally of the direction of travel parallel to beam 18. Shaft 42 is rotatably mounted in a bearing 43 and is affixed at its end to a pin 44 secured to an eccentric 45 at a location radially displaced from the center thereof.

Pivotally mounted on eccentric 45 at a location radially displaced from pin 44 is a drive shaft 46 which extends rearwardly along beam 18 and is pivotally connected at its other end to another eccentric 47 at a location corresponding to its connection to eccentric 45, eccentric 47 being provided with a pin 48 secured to one end of another shaft 49 rotatable in a bearing 50.

Upon each end of shaft 46 is rotatably mounted a split bearing 51 secured to the upper end of a sleeve 52 which adjustably receives the threaded upper end of a rod 53 forming with sleeve 52 and bearing 51 a pitman 54 vertically reciprocable with the movement of shaft 46 in an orbit with eccentrics 45 and 47 about the axis of shaft 37.

The lower end of rod 53 is pivotally connected by a universal joint 55 to a pin 56 carried between the rear ends of the laterally spaced bar elements 57 of a rockable arm member in the form of a lever 58 fulcrumed medially of its ends upon a pivot pin 59 mounted between the plates of bracket 20 of the plow frame.

The forward ends of side bars 57 of rock arm or lever 58 are rounded and have affixed thereto rounded and hardened lateral projections 60 engageable with rollers 34. With the forward end of lever 58 engaging rollers 34 the reduced portion 32 of pivot pin 25 is disposed as shown in FIGURE 5 centrally of slots 26. Upon operation of the power operated means 11 of the tractor and rotation of shafts 14, 15 and 37, shaft 46 is revolved in an orbital path reciprocating pitmans 54 and rocking the levers 58. Due to the arc of travel of the forward ends of the side bars 57, the plow units 23 are vibrated by high speed reciprocation within the limits of slots 26.

As pointed out hereinbefore in FIGURE 1 only the forwardmost two plow units of a multi-bottom plow are shown. Where additional plow units are mounted on the plow frame, shaft 49 is mounted similarly to shaft 46 but displaced 180° from the axis of the latter to promote balance in the vibrating mechanism.

It is believed that the construction and operation of the novel implement vibrating mechanism of the present invention will be clearly understood from the foregoing description. It should likewise be understood that the invention has been described in its preferred embodiment and that modifications may be made therein without departing from the spirit of the invention or the scope of the appended claims.

What is claimed is:

1. In an implement adapted for attachment to a tractor having power operated means, a tool frame connected to the tractor in draft receiving relation, earth working tool means, means mounting the tool means on the frame including pin means carried by the tool means, said frame having a slot therein to receive said pin means accommodating limited reciprocatory movement of the tool means relative to the frame, a rock arm pivotally mounted on the frame having one end operatively frictionally engageable with said tool means, and means operatively connecting said rock arm to said tractor power operated means to rock said arm in an arc about its pivot to reciprocate said pin means in said slot.

2. The invention set forth in claim 1, wherein the earth working tool means includes a standard having an earth penetrating tool at its lower end and having at its other end a pivotal connection with the frame, and said slot is on an arc having said pivot means as its axis.

3. The invention set forth in claim 1, wherein said power operated means includes a power take-off shaft and a power transmission shaft is mounted on said tool frame and rotated by said power take-off shaft means, said power transmission shaft being eccentrically mounted with respect to and rotatable in an orbit about the effective axis of said power take-off shaft means and operatively connected to said rock arm to rock the latter.

4. The invention set forth in claim 3, wherein said power transmission shaft is rotatably received in an opening provided in one end of a link, the other end of which is connected to said rock arm.

5. The invention set forth in claim 4, wherein said rock arm is in the form of a lever having a fulcrum medially of its ends on the frame, one arm of said lever being engageable with said pin means and the other being connected to said other end of the lever.

References Cited

UNITED STATES PATENTS

| 3,167,134 | 1/1965 | Leo | 172—40 |
| 3,371,495 | 3/1968 | Kaercher | 172—40 X |
| 3,386,517 | 6/1968 | Kelley | 172—40 |

FOREIGN PATENTS

| 767,411 | 7/1934 | France. |

ABRAHAM G. STONE, *Primary Examiner.*

JIMMIE R. OAKS, *Assistant Examiner.*